Nov. 3, 1959 J. E. WITZKY 2,910,973
VARIABLE COMPRESSION RATIO TYPE ENGINE
Filed Sept. 15, 1955 5 Sheets-Sheet 1
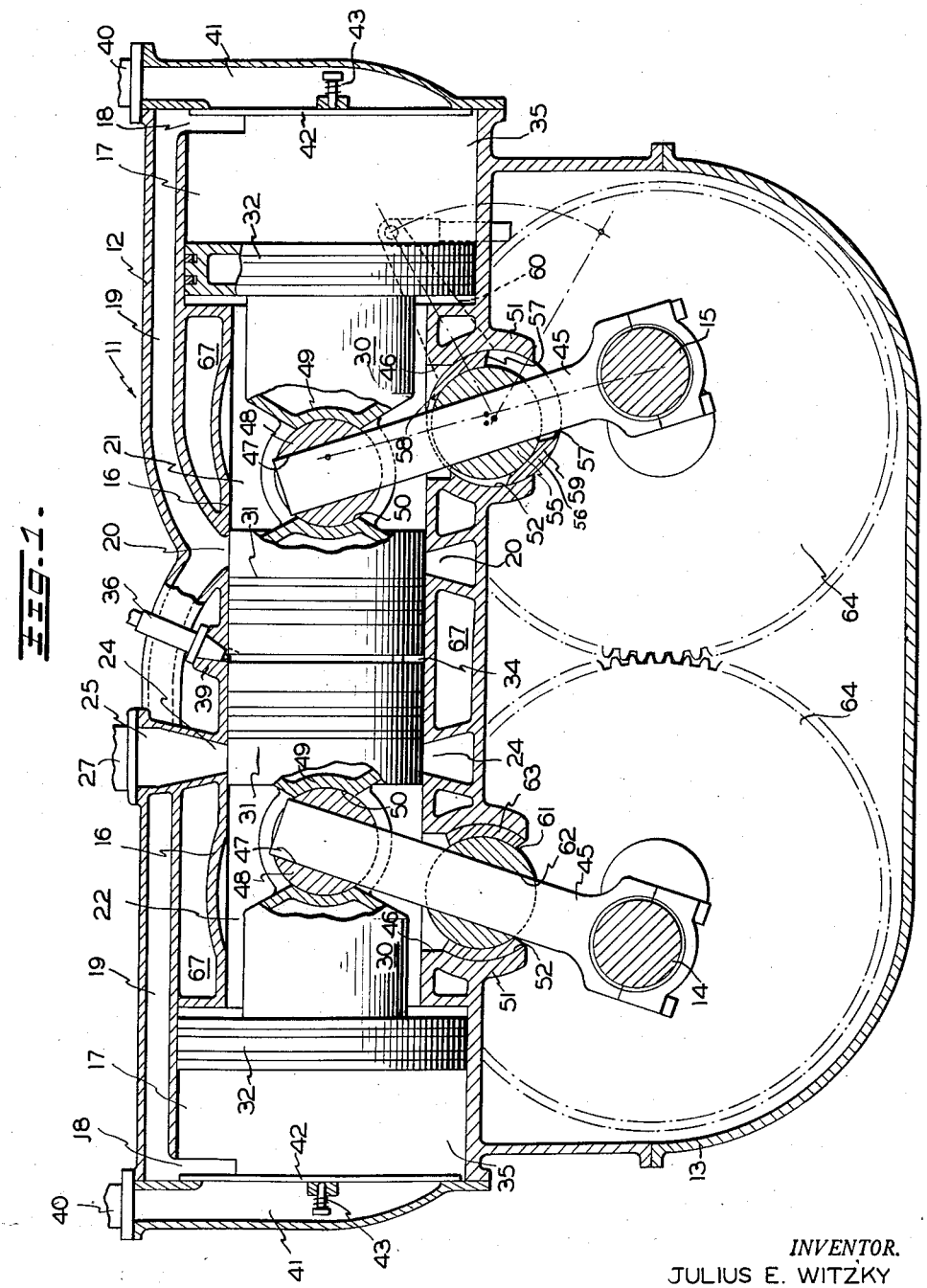
INVENTOR.
JULIUS E. WITZKY
BY
Wilson, Redrow & Sadler
Atty's Nov. 3, 1959 J. E. WITZKY 2,910,973
VARIABLE COMPRESSION RATIO TYPE ENGINE
Filed Sept. 15, 1955 5 Sheets-Sheet 2
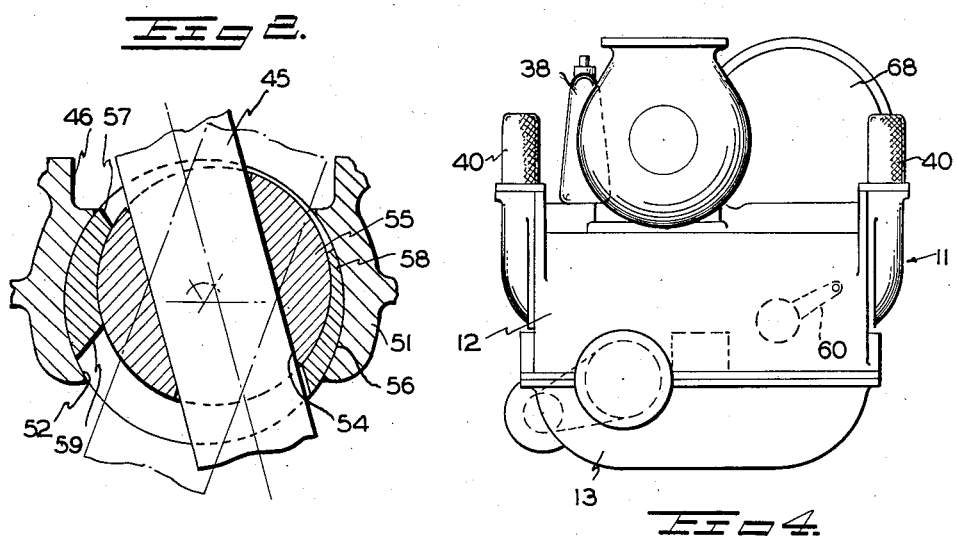
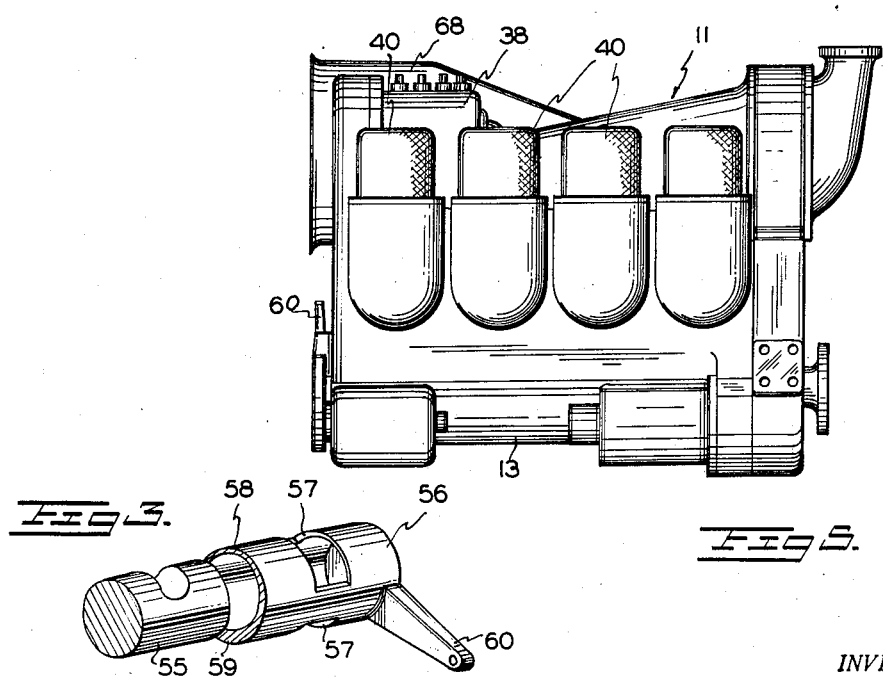
INVENTOR.
JULIUS E. WITZKY
BY
Wilson, Redrow & Sadler
Atty's Nov. 3, 1959 J. E. WITZKY 2,910,973
VARIABLE COMPRESSION RATIO TYPE ENGINE
Filed Sept. 15, 1955 5 Sheets-Sheet 3

INVENTOR.
JULIUS E. WITZKY
BY
Wilson, Redrow + Sadler
att'ys

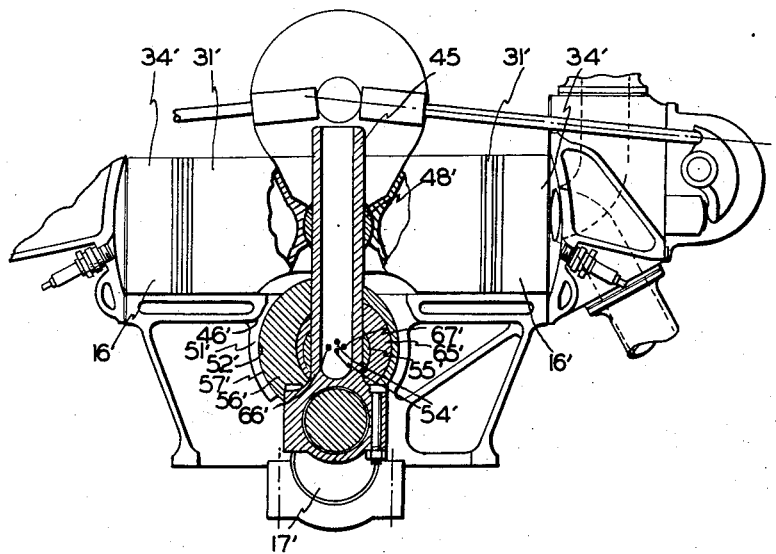

Nov. 3, 1959
J. E. WITZKY
2,910,973
VARIABLE COMPRESSION RATIO TYPE ENGINE
Filed Sept. 15, 1955
5 Sheets-Sheet 5
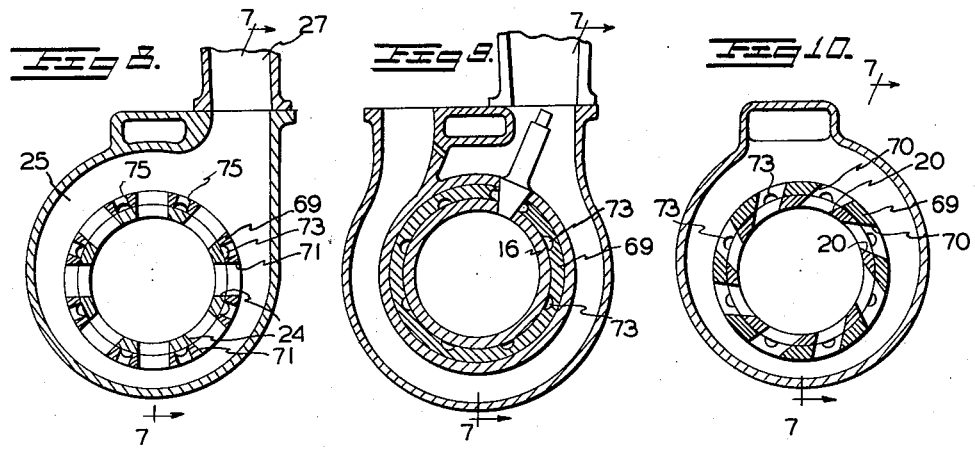
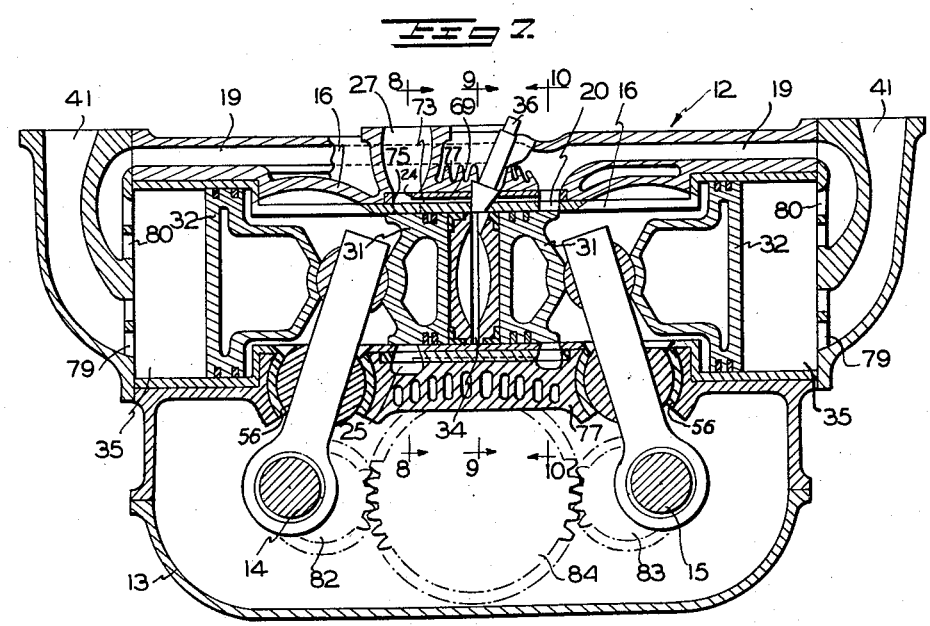
INVENTOR.
JULIUS E. WITZKY
BY
Wilson, Redrow & Sadler
attys United States Patent Office 2,910,973
Patented Nov. 3, 1959

2,910,973
VARIABLE COMPRESSION RATIO TYPE ENGINE

Julius E. Witzky, Royal Oak, Mich.

Application September 15, 1955, Serial No. 534,488

11 Claims. (Cl. 123—48)

This invention relates to engines and more particularly to variable compression ratio type engines.

The theoretical advantages of variable compression ratio type engines have long been known and appreciated by the designers of both compresion ignition (diesel cycle type) engines and spark ignition (Otto cycle type) engines. For instance, in a compression ignition engine a high compression ratio is required for starting the engine. However, for controlling the peak pressure the compression ratio should be gradually decreased as the engine speed and supercharger pressure is increased. In a spark ignition engine the purpose of the variable compression ratio arrangement is to maintain a constant compression pressure over the speed range. Therefore with a light load the throttle is almost closed and the compression ratio is maintained at a high level to give a high compression pressure and a good thermal efficiency. With a heavy load the throttle is almost fully open and the compression ratio is at a low level to give knock free performance on low octane fuel. The ability to vary the compression ratio results in greater fuel economy and efficiency for both compression ignition engines and spark ignition engines.

To improve the load economy in a spark ignition engine, the compression ratio should be gradually increased when the load is decreased in order to maintain a constant compression pressure over the speed range. At full load, the compression ratio is determined by the fuel knock rating. This will allow using a low octane fuel with some sacrifice in maximum output during a low compression ratio setting but with good part-load performance maintained with a high compression ratio setting. By being able to vary the compression ratio, both the best starting condition and best running condition can be built into one engine.

The variable compression ratio feature presents a means for producing a multi-fuel engine which, with minor variations, can use a wide variety of fuels including diesel fuels for compression ignition engines and gasoline fuels of all octane ratings for spark ignition engines.

Engines currently designed with variable compression ratios have not been able to realize the advantages just outlined due to the complicated and unsatisfactory nature of the constructions which provide for the change in clearance volume. These current engines generally require that the compression ratio be varied when the engine is shut off which has some advantages over fixed compression ratio systems, but loses the advantages of being able to vary the ratio of the engine as different load conditions demand.

It is therefore a principal object of my invention to overcome the above noted disadvantages of the prior art and to provide an improved engine with a relatively simple means for changing the compression ratio both when the engine is shut off and when it is running.

It is another object of my invention to provide an engine with a variable compression ratio that will permit the engine to operate more efficiently and more economically.

It is still another object of my invention to provide an improved engine wherein the power stroke of the engine compresses air for use as combustion air and as cooling air for the combustion chamber.

It is a further object of my invention to provide an improved engine that can be used with both compression ignition and spark ignition systems. A still further object of my invention is to provide an engine with different shaft arrangements for power takeoff.

And a still further object of my invention is to provide a supplemental air cooling system for additional cooling of the combustion chamber.

And another object of my invention is to provide an improved engine of simple construction and operation, which may not only be economically manufactured, but which will be efficient in use, uniform in operation and be unlikely to get out of repair.

These and other objects and advantages reside in certain novel features of construction, arrangement and combination of parts as will hereinafter be more fully described and pointed out in the appended claims.

Figure 1 is a vertical sectional view of an apparatus embodying my invention, with some parts in full and with the engine pistons approximately in firing position;

Figure 2A:
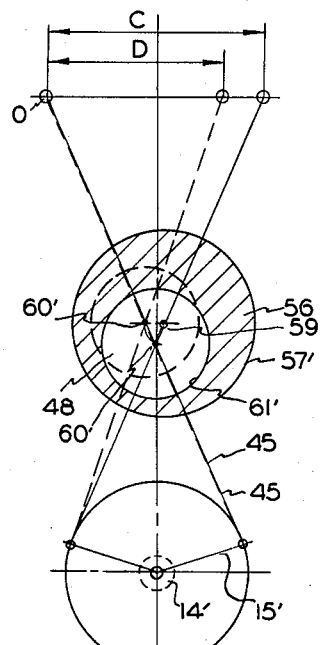
Figure 2 is an enlarged detail in section of the piston stroke varying mechanism.
Figure 2B:
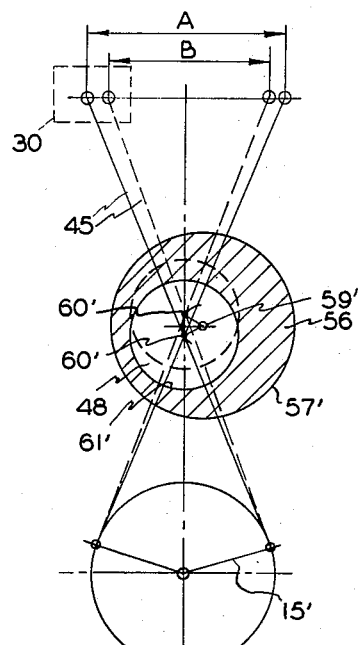
Figure 2C:
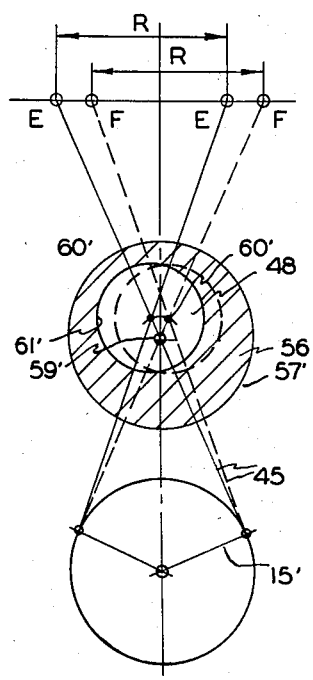

Figures 2A, 2B, and 2C are three different orientations of the piston stroke varying mechanism of Figure 2;

Figure 3 is an exploded perspective view of the parts of the piston stroke varying mechanism of Figures 1 and 2;

Figure 4 is an end view of an engine embodying my invention;

Figure 5 is a side view of the engine of Figure 4;

Figure 6 is a sectional view through a different type engine embodying a modification of my invention.

Figure 7 is a sectional view taken along the line 7—7 of Figure 8 showing modified structures of my invention;

Figure 8 is a sectional view taken on line 8—8 of Figure 7;

Figure 9 is a sectional view taken on the line 9—9 of Figure 7;

Figure 10 is a sectional view taken on the line 10—10 of Figure 7.

Referring specifically to the preferred form of my invention as shown in Figures 1 through 5 inclusive wherein similar reference numerals designate corresponding parts throughout the several views, an engine 11 is composed of a block 12 which has attached thereto a crankcase 13 in which is journaled a pair of parallel crankshafts 14 and 15. Horizontally formed in said block 12 is a plurality of pairs of power cylinders 16 only one pair being shown, disposed with their axis perpendicular to a vertical plane lying parallel to and midway between the crankshafts 14, 15. Communicating with the opposite end portion of each pair of power cylinders 16 is a pair of enlarged diameter air compressor cylinders 17 each one of which communicates through a port 18 and duct 19 with an annular series of ports 20 disposed around and in communicating relation with one-half portion 21 of the power cylinder 16. Communicating with the other half portion 22 of the power cylinder 16 is an annular series of exhaust ports 24 which are connected to an outlet duct 25 in an exhaust system 27 whereby burned gases may be expelled from the system.

Reciprocably mounted in the pair of cylinders 16 are a pair of two ended or double diametered pistons 30 each one of which has a power portion 31 disposed in the power cylinder 16, and a compressor portion 32 disposed in the adjoining compressor cylinder 17. With the two power portions 31 of the pair of pistons 30 facing each other in the power cylinder, a combustion chamber 34 is formed which is adapted during a part of the engine cycle to receive both air under pressure from the air compressor chambers 35 through ports 20 and fuel through an injection nozzle 36 which is connected to an injector pump 38.

It is important for proper operation of the engine for the area of the air compressor chamber 35 to be larger than the area of the combustion chamber 34. It has been found that several ratios of area of the air compressor chamber to combustion chamber work, the most satisfactory however, being when the area ratios are 2:1 with the air compressor chamber or piston being the larger. The 2:1 ratio provides ample air under sufficient pressure to thoroughly scavenge the combustion chamber 34 and to provide sufficient air to accomplish combustion.

Each compressor chamber 35 is connected to an air filter 40 through an inlet passage 41 which has a one-way valve 42 held closed by a spring 43 in such a manner that when the pistons 30 are moved toward the center portion of the cylinders 16 the valves 42 are opened and air will be pulled into the air compressor chambers 35. When the movement of the piston 30 is away from the center portion of the cylinders 16 the valves 42 will close and the air will be compressed until such time as the one piston 30 moves far enough for the power portion 31 thereof to uncover the inlet ports 20 and the power portion 31 of the other piston 30 uncovers the exhaust ports 24 wherein the compressed air will flow into the combustion chamber 34 through ports 20 and the spent gases will flow out through the exhaust ports 24.

Each piston 30 is connected to one of the cranks of one of the crankshafts 14, 15 by means of a lever 45 which is extended through an opening 46 in the wall of the cylinder 16 and is disposed in sliding relation in an opening 47 in a cylindrical bearing 48 carried by the central portion of each piston 30. The axis of the opening 47 lies substantially perpendicular to the horizontal axis of the bearing 48. Each piston 30 has a bearing seat 49 comprising a cylindrical bearing surface 50 which has an axis lying substantially parallel to the axis of the crank shafts. Said cylindrical bearing surface 50 is adapted to slidably engage with the outer surface of the cylindrical bearing 48 whereby said bearing 48 is permitted to oscillate about its axis relative to said bearing surface 50.

The opening 46 in the wall of the cylinder 16 has formed therein a bearing seat 51 having a cylindrical bearing surface 52 which has an axis that is oriented substantially parallel to the axis of the crank shafts 14, 15.

For the purpose of illustration in Figure 1 the right hand mounting of the pivot axis of the lever 45 through the wall of the cylinder 16 is shown different from the left hand mounting and will be described separately.

Figures 2 and 3 and the right hand portion of Figure 1 shows the intermediate portion of the lever 45 slidably mounted in an opening 54 in a cylindrical bearing 55 which has its outer surface in sliding contact with the inner surface of an eccentrically shaped sleeve or cam 56 which is seated in contact with the cylindrical bearing surface 52 of the bearing seat 51. The axis of the opening 54 in the bearing 55 is substantially perpendicular to the axis of said bearing 55 so that the axis of said opening 54 passes symmetrically through said bearing 55. The outer surface of the bearing member 55 slidably engages with and oscillates relative to the inner surface of the eccentric sleeve 56 whereby the lever 45 is permitted to pivot about the center of the cylindrical bearing member 55. The center of said bearing member 55 is shifted horizontally along a plane that lies substantially parallel to the axis of the bearing seat by turning the eccentric sleeve 56 about its axis.

The eccentrically shaped sleeve or cam 56 has a pair of openings 57 formed through the diametrically opposite sides thereof so that when said eccentrically formed sleeve 56 is mounted with its outer wall in engagement with said cylindrical bearing surface 52 in the bearing seat 51 said openings 57 will line up with the open portions of the bearing seat 51. The walls of said eccentrically formed sleeve 56 vary in thickness around the circumference thereof from a relatively thin section 58 to a relatively thick section 59 as is best illustrated in Figures 2 and 3. An actuating handle 60 projects radially outward from the side of one end of said sleeve 56 so that when said sleeve is in position in said bearing seat 51, handle 60 will be disposed on the outside of one end of the engine, whereby movement of said handle 60 in either a clockwise or counterclockwise direction about the axis of said eccentric sleeve 56 will rotate said eccentric sleeve relative to the bearing seat 51. The fit between the outer surface of the sleeve 56 and the cylindrical bearing surface 52 is such that the sleeve 56 can be moved by the handle 60, but said sleeve cannot move or drift about its axis under the normal movement of the cylindrical bearing 55 relative to the inner surface of said sleeve 56. In the form of the invention illustrated in Figures 1, 2 the rotation of the eccentric sleeve 56 about its axis will shift the axis of the cylindrical bearing member 55 substantially along a horizontal plane. This will cause a horizontal shift of the axis of the lever 45 so that the compression ratios of the combustion chamber and compression chamber will be proportionately increased and decreased respectively, i.e. if the compression ratio in the combustion chamber 34 is increased then the compression ratio in the air compressor chamber is decreased proportionately, or vice versa.

The left hand portion of Figure 1 shows a different mounting for the intermediate portion of the lever 45 and comprises a cylindrical bearing 61 having an opening 62 through which the lever 45 slidably passes. Said cylindrical bearing 61 is slidably mounted in a bushing 63 which is seated in the bearing seat 51. Since the surfaces of the bushings 63, bearing seat 51 and cylindrical bearings 61 are all symmetrically formed about the same axis, the lever 45 will pivot essentially around said axis and provide a pre-set stroke to the piston 30 disposed in the left hand portion of Figure 1.

The crankshafts 14, 15 are connected to two flywheels 64 which are in mesh with each other and from which a power take-off is appropriately connected in a conventional manner. Also, connected with the crankshafts 14, 15 is a timing mechanism not shown which is adapted to operate the plurality of outlets 37 on the fuel injector pump 38 in proper timed sequence whereby fuel is supplied to the combustion chambers of the engine during the correct stage of the engine cycle.

The engine can be water cooled as shown in Figure 1 wherein the jacket of the block 12 has a series of ducts 67, particularly surrounding the combustion chamber, whereby water will be permitted to flow in cooling relation thereto. Figures 4, 5 show an engine with an air cooling system wherein the cooling air is introduced in the system by the cooling blower 68 and is forced through ducts and over fins on and in the block to effect the cooling thereof in conventional manner.

In operating the engine as illustrated in Figures 1 and 5, the pistons 30 are shown at the inner end of the compression stroke just as the combustible mixture is about to be ignited as by means of a spark or by compression. During the resulting power stroke of the pistons 30 power is transmitted to the crankshafts 14, 15 through the levers 45. At an appropriate point in the power stroke the exhaust ports 24 and inlet ports 20 are uncovered whereby compressed air from the compressor chambers 35 enters the combustion chamber 34 through the ports 20 displacing the burned gases from the cylinder through the exhaust ports 24 and thereby scavenging the cylinder and leaving a quantity of fresh air therein for the compression stroke which immediately follows. During the compression stroke the ports 20, 24 are closed and the air is compressed as the pistons 30 move toward each other. At an appropriate point in the compression stroke, a quantity of fuel, such as gasoline or diesel-fuel, is injected through the nozzle 36 into the combustion chamber.

During the compression stroke of the gasoline engine, fuel will be injected by nozzle 36 at the beginning of the compression stroke and the fuel and air in the combustion chamber will be thoroughly mixed so that upon reaching approximately the position of Figure 1, the mixture is ignited by the spark from a spark plug (not shown). During the compression stroke of the compression ignition engine, the fuel will be injected close to top dead center and ignited by the heat of compression.

During the starting of the engine using diesel type fuel it is desirable to have a high compression ratio in the combustion chamber, therefore the eccentric sleeve 54 is positioned so that the maximum displacement of the piston 30 will be on the combustion chamber side as shown in Figure 1. After the engine has warmed up, assuming the speed of the engine is to be increased, the eccentric sleeve 54 can be turned clockwise, as viewed in Figures 1 and 2, to the position of Figure 2 whereby the amount of displacement in the combustion chamber is diminished and the compression ratio therein will be appropriately lowered. These adjustments of the compression ratio permit a maximum of fuel economy for every load and speed condition, and will control the combustion peak pressure. A corresponding series of adjustments are available for use with gasoline type, spark ignition systems to maintain a constant compression pressure over the speed range.

The modifications of my invention shown in Figures 2A, 2B, and 2C diagrammatically illustrate the different orientations of eccentrically shaped sleeves 56 that will permit the piston stroke and compression ratios of an engine to be varied in different ways. In all three figures, 2A, 2B and 2C a crankshaft 14' has a crank 15' which is connected to one end portion of the lever 45. Said lever 45 being represented as a line. The other end portion of said lever 45 is connected to a piston 30 shown only partially in dotted lines in Figure 2B. The intermediate portion of the lever 45 has a cylindrical bearing member 48 which is nested in the eccentrically shaped sleeves 56, all substantially as shown and described previously with respect to Figures 1–5. The sleeve 56 as shown in Figures 2A, 2B and 2C do not have openings 57 formed therein.

Figure 2B illustrates the situation whereby both the eccentric sleeve 56 and outer cylindrical wall 57' of the eccentric sleeve 56 have a common axis 59' which is spaced substantially horizontally from the axis 60' of the inner cylindrical wall 61' of the eccentric sleeve 56. When the eccentric sleeve 56 is rotated a few degrees on either side of the horizontal plane containing the axis 59' of the sleeve, about said axis 59', the axis 60' of the inner wall 61' subscribes an arc that has the extreme points lying substantially in a vertical plane. Since the pivot axis of the lever 45 follows the axis 60' of the inner cylindrical wall 61', said pivot axis will be moved substantially in a vertical plane when said sleeve 56 is rotated as just described. The vertical movement of the axis of lever 45 will effectively shorten the length of the stroke of the piston 30 from length A to length B which, when used in an opposed piston engine such as shown in Figure 1, will in effect decrease the compression ratio in both the combustion chamber and the compressor chamber by substantially the same amount.

Figure 2C illustrates the situation whereby the axis 60' of the inner cylindrical wall 61' will be positioned substantially vertically from the axis 59' of the eccentric sleeve 56. In this construction, turning of the eccentric sleeve 56 a few degrees on either side of the vertical plane containing the axis 59' of the eccentric sleeve 56, about said axis 59' will move the axis of the lever 45 substantially along a horizontal plane that is spaced from and is parallel to the axis 59' of the sleeve 56. When the eccentric sleeve 56 is rotated about its axis 59', the stroke R of the piston is not lengthened or shortened, but said stroke is displaced horizontally to the right substantially as shown in Fig. 2C from the solid line position E, E to the dotted line position F, F. The effect of the illustrated horizontal shift in Figure 2C is to decrease the compression ratio on one side of the piston i.e. the combustion chamber side, and to increase said compression ratio on the other side of the piston, i.e. the compressor chamber side. It is obvious that the stroke could be shifted to the left just as effectively without departing from the invention.

Figure 2A shows the eccentric sleeve 56 oriented in such a way that the axis 59' of the sleeve 56 is positioned relative to a median position of the axis 60' which lies between the dotted line position and solid line position of the inner cylindrical wall 61'. Said median position of axis 60' lies in a plane disposed substantially at a 45° angle relative to the horizontal plane containing the axis 59' of the sleeve 56. In this manner, when the sleeve 56 is rotated about its axis 59' so that the axis 60' of the inner wall 61' moves equal amounts on opposite sides of said plane disposed at 45°, the effect will be to shift the pivot axis of the lever 45 in such a way that the stroke of the piston will be varied from length C to length D without moving the one terminal position O of the piston. When applied to an engine, the effect of this will be to hold the compression ratio on one side of the piston fixed, i.e. the combustion chamber side, and to vary the compression ratio on the other side of the piston, i.e. the compressor chamber side or vice-versa. In Figure 2A, the effect will be to hold the compression ratio on the left hand side of the figure fixed, and to decrease the compression ratio on the right hand side of the figure.

It is thought, in view of the illustrations described, that a person skilled in the art will be able to make logical variations of Figures 2A, 2B, and 2C whereby different combinations of the three extreme conditions can be effected to accomplish combinations of the results. The many various combinations of Figures 2A, 2B, and 2C are understood to be within the scope of the invention.

Figure 6 shows a modification of my improved piston stroke varying mechanism as applied to a different type of engine wherein a piston has a power piston 31' on each end thereof and which is slidably mounted in a cylinder 16' to form two combustion chambers 34' on opposite ends thereof. Rotatably mounted in the crankcase of the engine is the crankshaft 17' which has one end of the lever 45' connected to a crank thereof. The lever 45' passes through an opening 46' in the cylinder 16' and has the other end portion journaled in a cylindrical bearing member 48' which is rotatably mounted in the bearing seat 49' between the pistons 31'.

Formed in the opening 46' in the cylinder 16' is a bearing seat 51' which has a cylindrical bearing surface 52' in sliding contact with an outer cylindrical wall 57' of an eccentrically formed sleeve 56'. Nested in said eccentrically formed sleeve 56' is a second eccentrically formed sleeve 65' which is adapted to be moved relative thereto. Intermediate the ends of said lever 45' and nested in said second sleeve 65' is a second cylindrical bearing member 55' which is adapted to be slidably movable along the lever 45'. The pivot axis 54' of the lever 45' forms the axis for the cylindrical bearing member 55'.

The eccentrically formed sleeve 56' has a pivot axis 66' about which said sleeve 56' is adapted to turn when said sleeve 56' is rotated. The second eccentric sleeve 65' has a pivot axis 67' about which said sleeve 65' is adapted to turn when said sleeve 65' is rotated. The cylindrical bearing member 55' has its pivot axis lying in a plane that is perpendicular to the line joining the axis 66' and 67' so that rotating the sleeve 56' clockwise and the sleeve 65' counterclockwise or rotating sleeve 56' counterclockwise and sleeve 65' clockwise will move the axis 54' of the lever 45' in a truly vertical plane. The result of this movement in a vertical plane will be to lengthen or shorten the stroke of the piston, symmetrically about the centerline of the engine. In other words, the relative displacement in each combustion chamber will be kept equal and will be increased or decreased by the same amounts. This is not only important but absolutely necessary in engines of this particular type.

The form of engine shown in Figures 7 to 10 discloses two additional modifications of my invention, the first modification relating to the cooling system for the block 12. The parts of the engine shown in Figures 7 to 10 that are the same as those shown in Figures 1 to 5 have the same reference numerals. The block 12 has the cylinder 16 which has inlet ports 20 and outlet ports 24 therein. Mounted around the outside of the cylinder 16 particularly in the vicinity of the combustion chamber 34 is a housing 69 which extends along the axis of the cylinder to points just beyond the inlet ports 20 and exhaust ports 24 respectively. Said housing 69 has inlet and exhaust ports 70, 71 that are aligned with the inlet and exhaust ports 20, 24 respectively of the cylinder. Formed on the inner surface of the housing 69 is a series of grooves 73 each one of which extends from the wall of the inlet port 70 in the one end portion of the housing 69 to a radial opening 75 formed in the other end portion of the housing. Each opening 75 lies between adjacent ports 71 about the periphery of the housing 69, and in communicating relation with the outlet duct 25 of the exhaust system 27. In this manner, some compressed air from the compression chamber is forced into the openings 70, through the grooves 73 and out into the exhaust system 27 through the openings 75, so that some of the relatively cool compressed air is diverted through the walls of the cylinder 16 for substantially aiding in the cooling of the combustion chamber 34. The grooves 73 in the vicinity of the injector nozzle 36 are shaped around the nozzle 36 so as to cool the nozzle. In addition to this just described cooling feature, the system is cooled further by the blast from a cooling blower 68 which passes air through and over the walls of the block and the cooling fins 77.

Figure 10 shows the inlet ports 20 and 70 disposed at an angle to the radial direction of flow of the air entering the combustion chamber. This has been done to create a vortex in the air stream that will increase the turbulence in the combustion chamber to aid in the mixing of air with the fuel injected through nozzle 36.

In Figure 7 the air inlet 41 from the air filter has a one-way valve 79 which will admit air from the filter into the compressor chamber 35, but will not permit reverse flow thereof. Said compressor chamber 35 has a one-way valve 80 which will permit air to flow from the compressor chamber 35 into the ducts 19 to the inlet ports 20, 70, and cooling grooves 73, but will not permit the air to flow in reverse, namely from the combustion chamber 34 back into the compressor chamber 35. Since the ports 70, grooves 73 and openings 75 are practically always open to the flow of air from the compressor chamber 35, a certain amount of cooling of the combustion chamber around the power cylinder will be accomplished at all times, however, the greatest cooling will be during the greatest build up of pressure in the compression chamber.

The crankshafts 14, 15 are connected to and drive a pair of gears 82, 83 respectively, which are connected to and drive the single flywheel 84 which is adapted to furnish the power to perform the work required of the engine.

The second modification of my invention shown in Figure 7 relates to the eccentric sleeves 56 which are associated with and act upon both levers 45 in this embodiment whereby the stroke of both pistons 30 are adjusted together. Since both sleeves 56 are adjusted simultaneously, the compression ratios can be varied over a wider range. It is to be understood that the use of an eccentric sleeve cam member 56 whether on all or on only some of the piston levers 45 is within the scope of this invention.

It will be understood that various forms of the invention other than that described above may be used, without departing from the spirit or scope of the invention.

What is claimed is:

1. An engine comprising a cylinder, a piston slidably mounted in said cylinder, a crank shaft carried by said engine and having its axis lying substantially perpendicular to the vertical plane containing the axis of the cylinder, lever means journaled on said crank shaft and extending through an opening in said cylinder, said lever means being slidably and oscillatably mounted on one portion of said piston, cam means acting between the intermediate portion of the lever means and the walls of said opening in the cylinder, and means for turning said cam means for shifting the pivot axis of the lever means substantially parallel to the axis of the cylinder whereby the stroke of the piston can be moved along the axis of the cylinder.

2. In combination with an engine, a piston having one end forming one side of a combustion chamber, supported crankshaft means, a lever connected at one end for rotation with the crank shaft means, said lever being slidably and oscillatably connected to the piston, and cam means receiving a portion of the lever and being supported in a manner to provide for freedom of movement of the latter in two directions with respect to a fulcral axis defined by said cam means.

3. An engine comprising a double diametered piston having the small end forming one side of a combustion chamber and having the large end forming one side of a fluid compressor chamber, communicating means between the combustion chamber and the compressor chamber, rotatably mounted crank shaft means, a lever slidably related at one end to an intermediate portion of the piston and connected at the other end for rotation with the crank shaft means, and slide bearing means comprising eccentric sleeve means receiving a fulcral portion of the lever and journaled to oscillate about an axis encompassed within the area immediately occupied by the slide bearing means.

4. In an internal combustion engine the combination of a piston having an end portion forming one side of a combustion chamber, a crank case, crank shaft means rotatably mounted in said crank case, lever means pivotally mounted at one end portion on said crank shaft means, the other end portion of said lever means being slidably and rotatably mounted on said piston, and cam means slidably receiving a portion of the lever and fulcrumed to oscillate about an axis encompassed within the area immediately occupied by said cam means.

5. In an internal combustion engine the combination of a piston having a combustion chamber on opposite ends thereof, a crank case, crank shaft means rotatably mounted in said crank case, lever means having two end portions, one end portion being pivotally carried by said crank shaft means, the other end portion of said lever means being slidably and rotatably mounted on said piston, and a nested pair of cam means carried by the wall of the cylinder and receiving a portion of the lever and mounted to provide for vertical movement of the pivot axis of the lever whereby the stroke of the piston is shortened symmetrically about the centerline of the engine.

6. An engine comprising an elongated cylinder, a pair of two-ended pistons slidably mounted in opposed relation in said cylinder to form a combustion chamber therebetween, crankshafts carried by the engine, a lever for each piston passing through openings in the cylinder and having one end portion pivotally mounted on said crank shafts, the other end portion of each lever being slidably mounted in an intermediate portion of one of said pistons, and means acting between a portion of each lever and the walls of the adjoining opening in the cylinder for shifting the pivot axes of the levers whereby the compression ratio of the engine may be varied.

7. An engine having an elongated cylinder, a piston slidably mounted in said cylinder to form a combustion chamber at one end thereof, a crank shaft rotatably mounted in the engine, a lever connected at one end for rotation with said crankshaft, said lever extending through an opening in the cylinder and having the other end thereof slidably connected to the piston, a bearing seat formed in said opening in the cylinder, an eccentrically formed sleeve movably mounted in said bearing seat, a cylindrical bearing member nested in said eccentrically formed sleeve and having an opening therethrough in which said lever is slidably mounted, and means for turning said sleeve relative to said bearing seat for shifting the pivot axis of the lever whereby the compression ratio of the engine can be varied.

8. An engine having an elongated cylinder, a piston slidably mounted in said cylinder to form a combustion chamber at one end thereof, a rotatably mounted crankshaft carried by the engine, a lever connected at one end for rotation with said crankshaft, said lever extending through an opening in the cylinder and having the other end thereof slidably connected to the piston, a bearing seat formed in said opening in the cylinder, said bearing seat having a cylindrical bearing surface formed therein, an eccentrically formed sleeve having an outer cylindrical wall in sliding contact with said cylindrical bearing surface, a second eccentrically formed sleeve nested in said first-named sleeve and adapted to be movable relative thereto, a cylindrical bearing member nested in said second sleeve and adapted to be movable relative thereto, said cylindrical bearing member having an opening transversely therethrough in which said lever is adapted to be slidably mounted, and means for turning said first and second sleeves in opposite directions relative to each other for moving the pivot axis of the lever along a vertical plane whereby the length of the stroke of the piston is varied.

9. An engine comprising an elongated cylinder, a pair of pistons slidably mounted in opposed relation in said cylinder to form a combustion chamber between the opposed ends of said pistons, means associated with said combustion chamber for providing a power stroke for said pistons, at least one crankshaft carried by said engine with the axis thereof lying perpendicular to the vertical plane containing the axis of the cylinder, and means carried by each piston and by the crankshaft for changing the reciprocating motion of the pistons to rotational motion of the crankshaft, said last-named means comprising a lever journaled on said crankshaft and extending into the cylinder through an opening in the wall thereof, a pair of cylindrical bearing members slidably mounted on said lever with the longitudinal axis of said bearings lying parallel to the axis of the crankshaft, one of said bearing members being oscillatably mounted on one of said pistons, a bearing seat having a cylindrical bearing surface mounted in said opening in said cylinder, an eccentrically formed sleeve slidably mounted in said bearing seat, said other bearing member on said lever being slidably mounted in said sleeve, and means for turning said sleeve for shifting the pivot axis of the lever whereby the compression ratio of the engine can be varied.

10. In an engine having an elongated cylinder, a pair of pistons slidably mounted in opposed relation in said cylinder to form a combustion chamber between the opposed ends of said pistons, and at least one crankshaft carried by said engine, the combination of means associated with each piston and with the crankshaft for transmitting reciprocating motion of the piston to rotational motion of the crankshaft comprising a bearing seat formed in one portion of one of said pistons and having an axis lying substantially perpendicular to the axis of the piston, a cylindrical bearing member having an opening extending therethrough substantially perpendicular to the axis of said member, said bearing member being slidably mounted in said bearing seat, a lever having one end portion pivotally mounted on said crankshaft, the other end portion of said lever being slidably mounted in said opening in said cylindrical bearing member, a bearing seat formed in the cylinder wall between said piston and said crankshaft, a second cylindrical bearing member slidably carried by the intermediate portion of the lever, a hollow eccentrically shaped adjusting means encasing said last-named cylindrical bearing member and fitting within the last-named bearing seat, and means for rotating said eccentrically shaped adjusting means about its longitudinal axis for shifting the pivot axis of the lever whereby the length of the piston stroke will be varied.

11. A device for varying the compression ratio in an opposed piston engine comprising in combination an elongated cylinder, a piston slidably mounted in said cylinder, a crankshaft perpendicular to the vertical plane of said cylinder, a lever having one end slidably and rotatably engaging said piston and the other end rotatably engaging said crankshaft, adjustable fulcrum means slidably engaging the central portion of said lever, said fulcrum means including an eccentric cylindrical member.

References Cited in the file of this patent

UNITED STATES PATENTS

| Number | Name | Date |
|---|---|---|
| 1,025,251 | Desmond | May 7, 1912 |
| 1,189,312 | Tibbels | July 4, 1916 |
| 1,753,159 | Stickney | Apr. 1, 1930 |
| 2,079,156 | Danckwortt | May 4, 1937 |
| 2,270,546 | Neuland | Jan. 20, 1942 |
| 2,305,310 | Hellweg | Dec. 15, 1942 |
| 2,332,618 | Wagner et al. | Oct. 26, 1943 |
| 2,647,498 | Hickey | Aug. 4, 1953 |

FOREIGN PATENTS

| Number | Country | Date |
|---|---|---|
| 476,625 | Germany | May 28, 1929 |
| 732,073 | France | June 6, 1932 |